INVENTORS:
THOMAS W. G. RICHARDSON
GLENN D. JOHNSON
DEAN P. HEMPHILL
BY: A. H. McCarthy
THEIR ATTORNEY

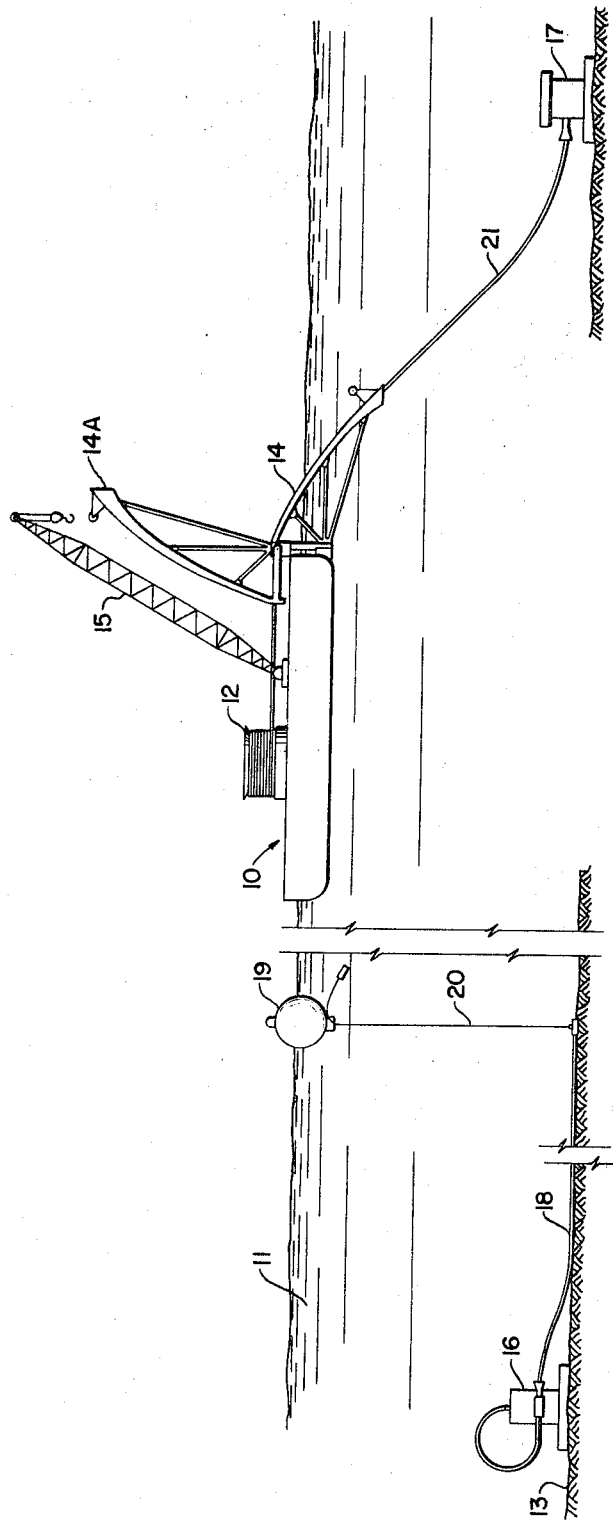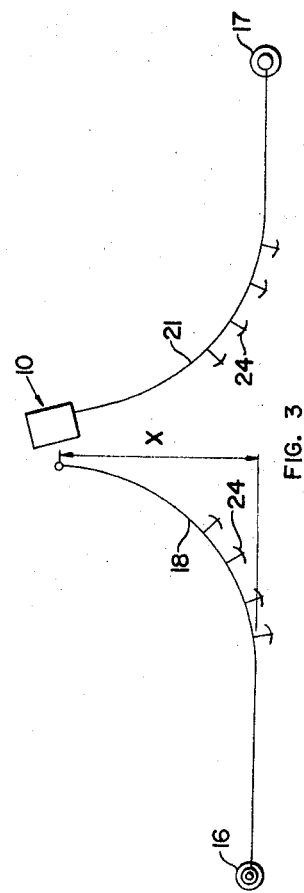

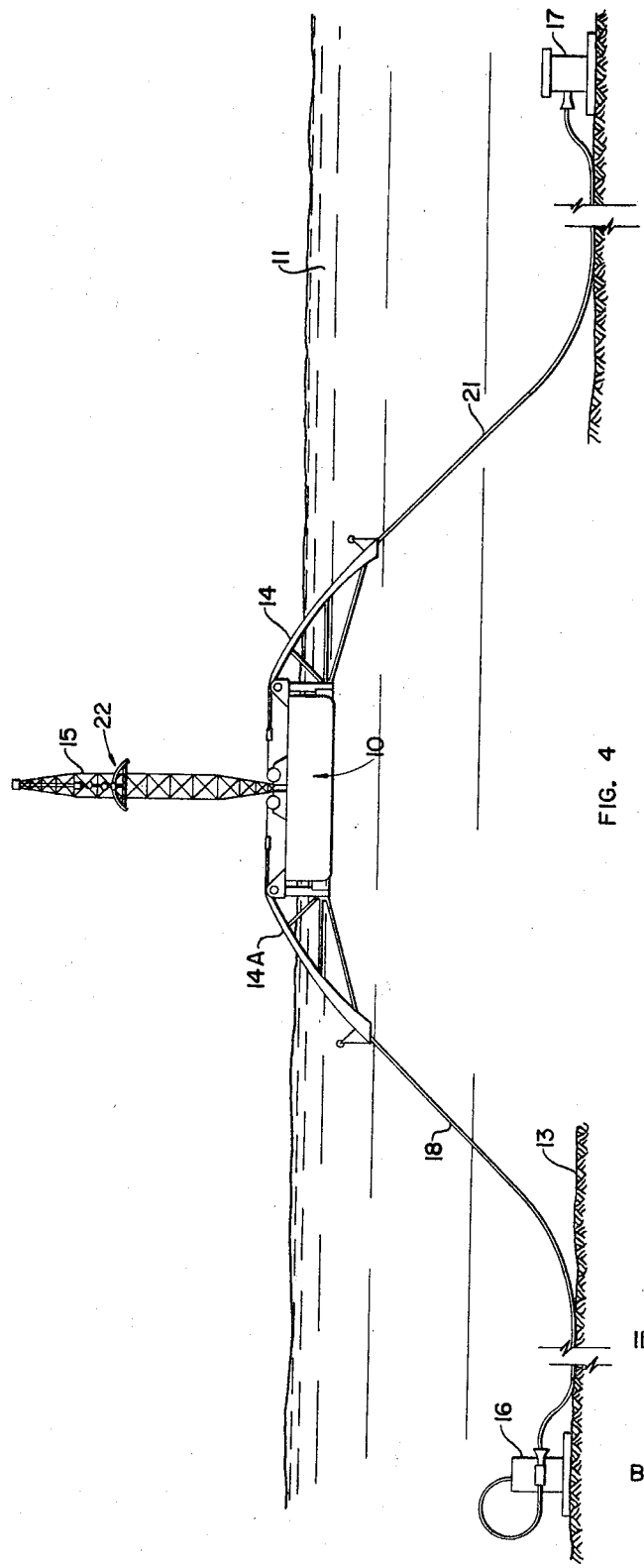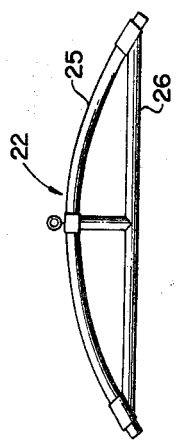

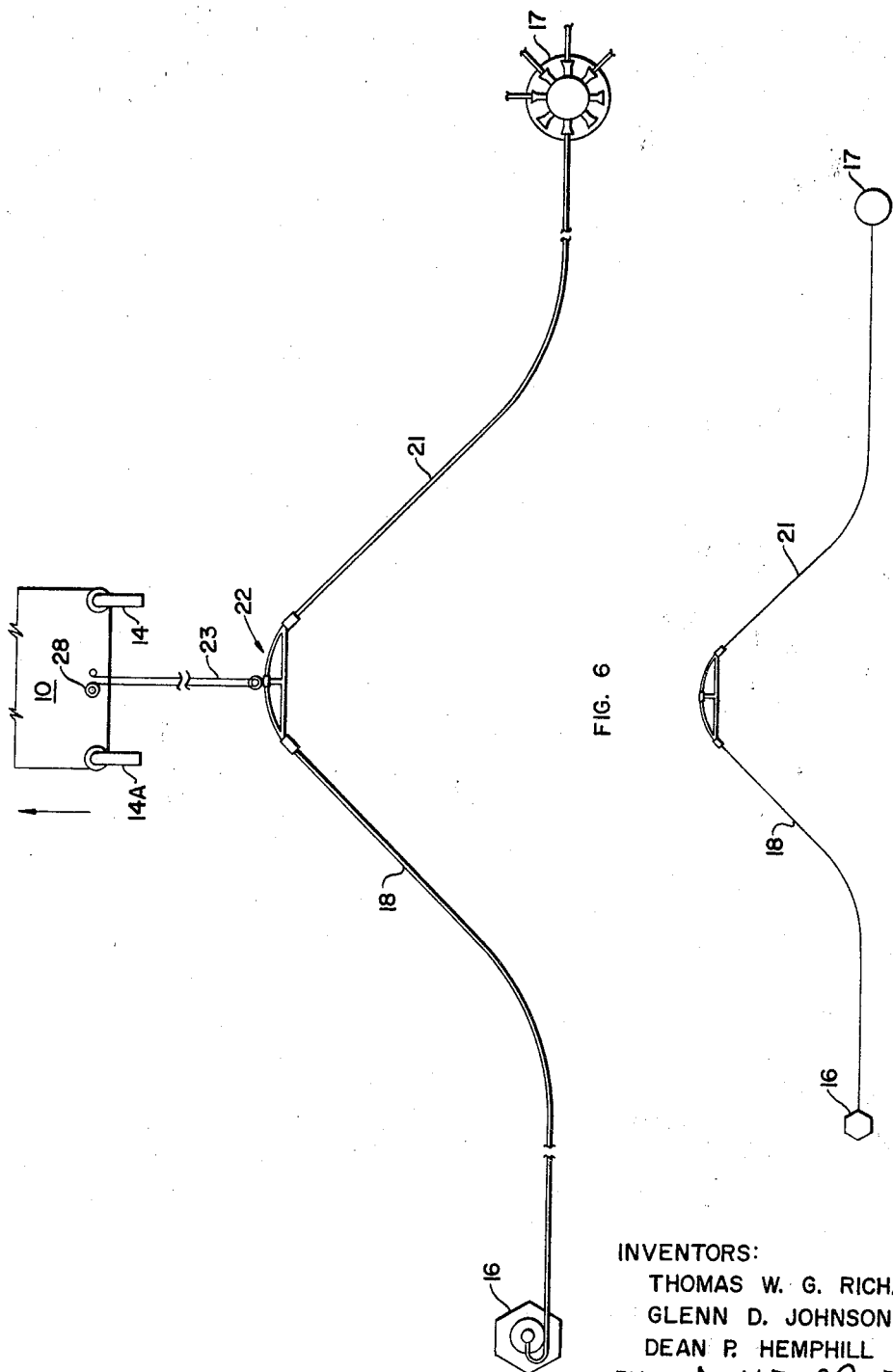

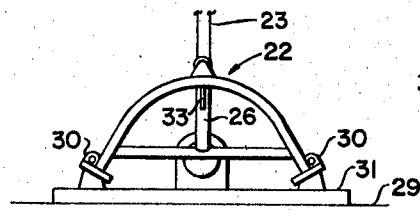
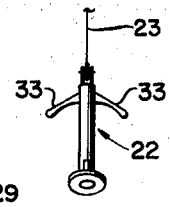
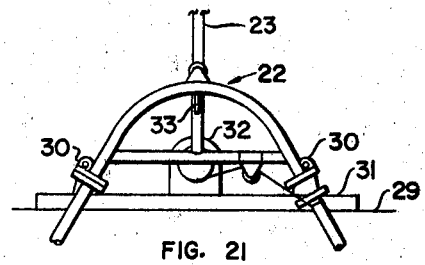
FIG. 19　　　　　　FIG. 23　　　　　　FIG. 21
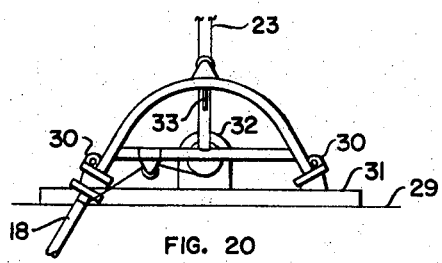
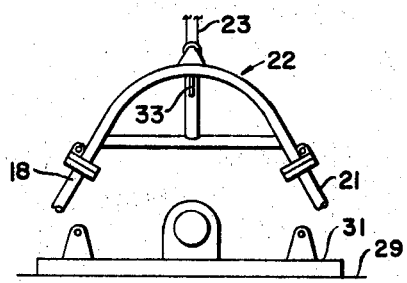
FIG. 20　　　　　　　　　　　FIG. 22
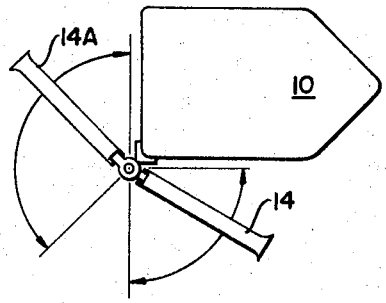
FIG. 24
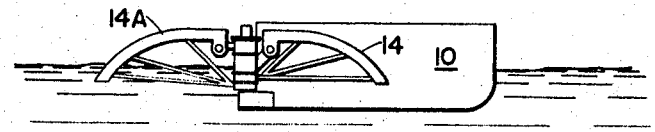
FIG. 25
INVENTORS:
THOMAS W. G. RICHARDSON
GLENN D. JOHNSON
DEAN P. HEMPHILL
BY: A. H. McCarthy
THEIR AGENT

United States Patent Office 3,431,739
Patented Mar. 11, 1969

3,431,739
METHOD FOR LAYING UNDERWATER PIPELINE
Thomas W. G. Richardson, Houston, Tex., Glenn D. Johnson, Downey, Calif., and Dean P. Hemphill, Houston, Tex., assignors to Shell Oil Company, New York, N.Y., a corporation of Delaware
Filed Sept. 28, 1966, Ser. No. 582,601
U.S. Cl. 61—72.3                           8 Claims
Int. Cl. B63b 35/04; F16l 1/00; E02f 9/06

ABSTRACT OF THE DISCLOSURE

A method of laying an underwater pipeline between two fixed facilitates in which pipeline segments are laid from each facility along the floor of a body of water toward the other facility, until they approximately meet, after which the two pipelines are joined at the water surface and the resultant "loop" formed by the connected pipelines is laid onto the water floor by pivoting the "loop" to one side.

---

This invention relates generally to a method for laying fluid or gas transporting pipelines and more particularly to a method for laying such pipelines from a barge onto the floor of a body of water. The method is especially adaptable for laying pipelines between fixed locations on an ocean floor, for example, between an underwater wellhead and an underwater central facility which collects oil or gas from a plurality of wells.

Prior art methods of laying pipelines underwater from a barge require at least one underwater connection which generally necessitates the use of a diver to make the connection. Although there are known methods for making an underwater connection remotely from the water surface without the necessity of a diver, as disclosed for example in U.S. Patent 3,233,314 to Watkins et al., such methods require that the connection be made and then the pipeline laid radially away from the connection. This is accomplished as in the Watkins patent by lowering the end of a pipeline from a barge, making a connection to an underwater facility and moving the barge in a direction radially away from the facility as pipeline is lowered from the vessel onto the ocean floor. In order to connect the free end of the pipeline to another underwater facility after the pipeline is laid, it is necessary to utilize a diver to make the connection since the Watkins method is not adaptable where the lay barge approaches the facility. Another alternative is to start two pipelines, one from each facility, and lay the pipelines toward each other. They are then connected at some intermediate point on the ocean floor which also requires a diver to make the connection. Such methods are not suitable is relatively deep water in the order of up to 1,000 feet since these depths are beyond present diver capabilities.

Accordingly, there is a need for a method of laying pipelines from a lay barge along the floor of a body of water and connectable between two underwater facilities at greater than diver depths and it is to this end that the present invention is directed.

In accordance with the invention, the method for accomplishing this end comprises connecting one end of a first pipeline to an underwater facility, laying the pipeline on the floor of a body of water away from the facility, connecting a buoy to the free end of the first pipeline, lowering the buoyed end onto the ocean floor, connecting one end of a second pipeline to another underwater facility, laying the second pipeline on the floor of the body of water, raising the buoyed end of the first pipeline to the water surface, connecting the adjacent end of the pipeline to form a composite pipeline having a central loop extending from the floor of the body of water to the water surface, and lowering the loop onto the floor of the body of water while applying a predetermined tension on the loop having a vertical component extending upwardly and a horizontal component extending laterally away from a line drawn between the underwater facilities so as to control the descent of the loop onto the floor of the body of water.

At this point it will be noted that the method while particularly suited to deep water pipeline laying between underwater facilities is in no way so limited and may be practiced, for example, in shallow water and also when laying a pipeline between an underwater facility and a shore installation.

The invention will now be described in detail with reference to the accompanying drawings in which:

FIGURE 2 is an elevation showing the first pipeline laid and the second pipeline being laid;

FIGURE 3 is a plan view showing the relative positions of the pipelines prior to being connected;

FIGURE 4 is an elevation showing the ends of the pipelines pulled onto the barge to be assembled;

FIGURE 5 is a detail drawing of the curved connection used to assemble the pipeline ends;

FIGURE 6 is a plan view showing the assembled pipeline being lowered to the ocean floor;

FIGURE 7 is a plan view showing the assembled pipeline in its final at rest position;

FIGURES 19–23 are detail drawings of a preferred form of the connector used with the invention; and, FIGURES 24 and 25 are plan and elevation views respectively of a modified barge wherein the guides are mounted on a common swivel post.

Figure 1:
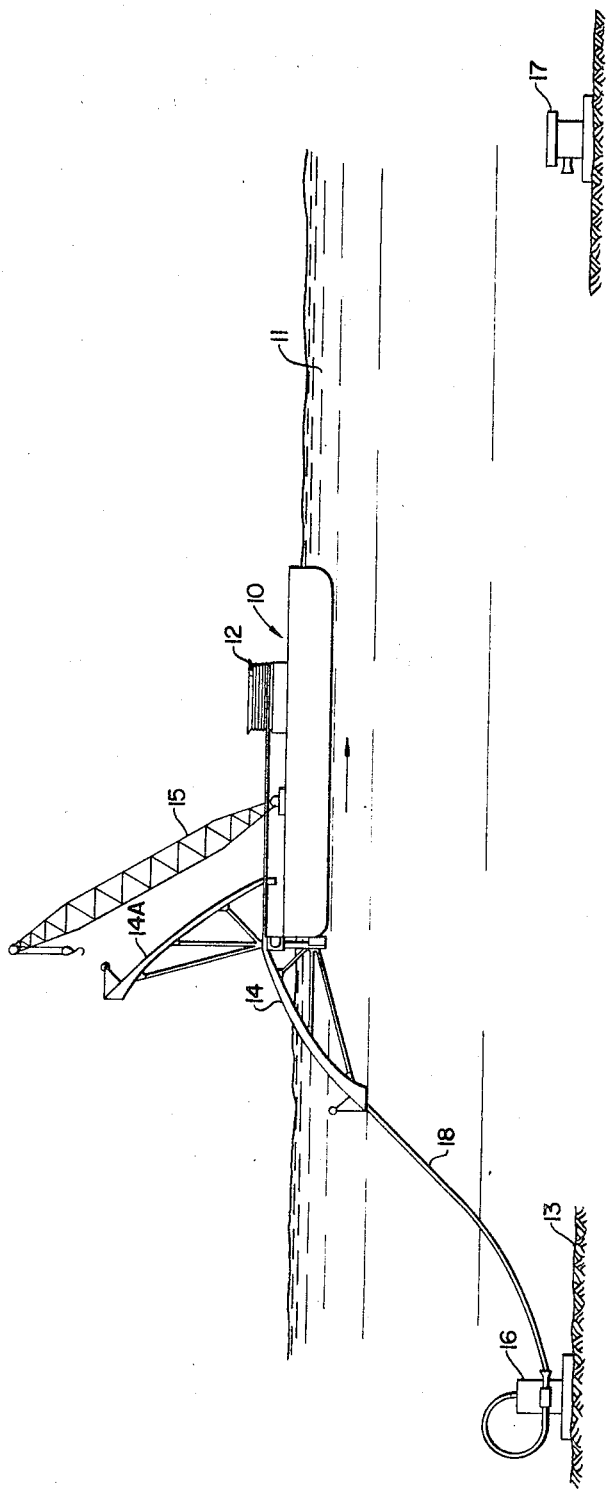
FIGURE 1 is an elevation showing the first pipeline being laid.

Referring now to FIGURE 1, a pipe laying barge indicated generally at 10 is shown floating on the surface of an ocean or body of water 11. The barge may be of any suitable design capable of laying pipeline onto the floor 13 of the water body. For example, the barge shown is of the reel type in which a pipeline is wound onto a reel 12 rotatably mounted on the deck of the barge but other types of lay barges may be used. Suitable guide means 14 and 14a are employed at the stern of the barge to guide the pipeline as it is run off the barge and laid on the floor 13 of the body of water. Each guide is pivotally mounted to the barge so that a guide may be tilted out of the water when not in use. A deck-mounted crane or derrick 15 may be used to move the guide to its retracted position.

In addition, as seen in FIGURES 24 and 25, the guides 14 and 14a may be rotatably secured to the barge 10 on a common swivel post 34. As can be seen both guides in this arrangement are mounted on post 34 which is disposed at a stern corner of the barge 10. Such arrangement promotes better maneuverability of the barge 10 and eliminates a couple in the pipelines as they are brought into position to receive a connector 22, described later in detail.

Located on the floor 13 of the body of water are a pair of underwater facilities which are shown diagrammatically as a wellhead 16 and a central collecting facility 17. As best seen in FIGURE 1, a pipeline 18 is connected to the wellhead 16 and laid along the floor 13 by moving the barge away from the wellhead in the direction of the arrow. As the pipeline is laid, the heading of the barge is gradually changed to approximately 90° from a line drawn between the underwater facilities. This change in the course of the lay barge effects a resultant curvature in the laid pipeline as best shown in plan view in FIGURE 3. In order to maintain the curvature of the pipeline 18 along the floor 13, suitable anchoring means may be employed to hold the pipeline in place as it is being laid. These means may take the form of a plurality of anchors 24 located along the pipeline which cooperate with the ocean floor. Other suitable means of maintaining the curvature may also be used. For example, guide lines may be attached to the pipeline from an auxiliary vessel to hold the pipeline in its curved configuration. Of course it will be understood that the weight of the pipeline and the soil condition of the ocean floor may provide sufficient friction to obviate the need for anchoring means. The hold back force, supplied by anchoring methods (FIGURE 3) or soil reaction, is needed to form the 90-degree curves and to supply back-tension as the pipeline segments are laid or when connected segments are lowered to the sea floor. The principal hazard of insufficient hold-back force is that laying forces required in forming the curve or laying down on the connected loop might cause the entire line to be dragged and result in "kinking" the pipeline or applying excessive forces where the pipeline segments are connected to the sea floor facilities.

It will be observed that the distance X that the pipeline end extends laterally from the direct path between the facilities must be at least equal to the water depth so that when the pipeline ends are rotated upward to be connected they will reach the water surface. When the arc of curvature of the laid pipeline appraoches 90°, a buoy 19 and recovery line 20 are connected to the end of the pipeline 18 and the pipeline is lowered to the floor 13 of the body of water, as shown in FIGURE 2. The buoy and recovery line are employed so that the end of the pipeline may be subsequently pulled up to the surface to be connected to the pipeline 21 as will be described later.

After the pipeline 18 is laid, the lay barge 10 or another similar pipe laying vessel proceeds to the vicinity of the central collector facility 17 (or other second sea floor structure) to initiate the laying of a second pipeline 21. The procedure for laying this pipeline is the same as that employed for laying pipeline 18. If the second pipeline is connected to a facility on shore or in shallow water, the remote connection may be eliminated since the connection will be performed on land or by divers in shallow water.

As best shown in FIGURE 3, the pipeline 21 also is laid in a curve having an arc of curvature approaching 90° terminating near the buoyed end of pipeline 18. By hoisting the recovery line 20, the end of the pipeline 18 may be recovered to the surface and drawn over guide member 14a. Thus positioned, the pipeline 18 is ready to be connected to the pipeline 21 which passes over the other guide 14 at the stern of the barge as shown in FIGURE 4. The pipelines are now in position for connecting in end-to-end fluid conducting relationship. Although the connecting and laying of pipelines 18 and 21 has been described as being performed by the same barge, it is contemplated that two vessels may be used: one vessel to connect and lay pipeline 18 and another to connect and lay pipeline 21. By using two vessels both pipelinees can be laid simultaneously, thus saving time over the sequential method described above in which one barge is used. In relatively deep water, it is preferable that pipelines 18 and 21 are laid while applying a predetermined tension to the pipeline to thus reduce the catenary formed by the pipeline so that the pipeline does not experience any sharp bending.

To effect the connection of the pipelines, a pipeline connector 22 as shown in detail in FIGURE 5 is utilized. The connector includes an arcuate pipeline portion 25 and a frame 26 of a suitable length to approximately span the gap between the ends of pipelines 18 and 21. In one method of installing the connector, it is lowered into position with the derrick 15 and the pipeline portion 25 is connected between the ends of pipelines 18 and 21 by any suitable means such as welding. The pipelines and the pipeline portion 25 may also be fitted with suitable mechanical coupling members for making a fluidtight mechanical joint.

Another method of installing the connector 22 is disclosed in sequence in FIGURES 19–22. As shown in FIGURE 19, the connector is secured to deck 29 of the barge 10 by means of pins or bolts carried in the holes of gussets 30 and corresponding holes in a support frame 31 mounted on the deck 29. Pipelines 18 and 21 are brought into connecting alignment with the connector 26 by means of winch 32 as shown in FIGURES 20 and 21 after which they are secured by welding or other suitable means. Finally, the connector 22 is disconnected from the support frame 31 (FIGURE 22) and the assembled connector and pipelines are lowered to the ocean floor 13 by guide line 23 as will be hereinafter described.

FIGURE 23 is a side view of the connector 22 showing flukes 33 formed on the brace member 26. These flukes serve as an anchor for the connector and also as a grapple recovery projection so that the connector may subsequently be recovered with a grapple and brought to the surface.

After the connection has been made, the composite pipeline consisting of pipeline 18, connector 22 and pipeline 21 is lowered onto the floor 13 by the barge 10 (FIGURES 6 and 7). To control the lowering step, a suitable guide line 23 is secured to the pipeline connector from the lay barge 10. The barge is then moved in the direction of the arrow as shown in FIGURE 6 while the guide line 23 is payed out under controlled tension from the lay barge to effect lowering of the pipeline. Since the manner in which tension is applied in lowering the connected pipeline segments is critical to the operation, it may be seen with regard to FIGURES 6 and 7 if taken in side view that the tension line is a catenary which supplies sufficient tension that the upper ends of the pipeline segments also approach catenary configuration.

It will be observed that as the composite pipeline is lowered, it swings in an arc having an axis substantially along the line drawn between the facilities 16 and 17. The loop formed by the ends of pipelines 18 and 21 moves from a position which is approximately vertical to a position where the loop lies hoirzontally on the ocean floor. During lowering, a restraining force is imposed on the guide line 23 in the form of a tensioning force having a vertical component acting upwardly and horizontal component acting away from the pipeline in the direction the barge is being moved. A suitable device for imposing the force may be a constant tension winch 28 located on the barge or other suitable means. The restraining force acting on the guide line 23 imparts a corresponding force to the pipeline as it is being lowered. Thus, the rate of descent and disposition of the pipeline is controlled thereby causing the composite pipeline to rotate about an axis described by a line drawn between the underwater facilities. This prevents the loop portion of the composite pipeline from descending freely which could cause buckling or failure of the pipe. While it is desirable to apply the restraining force during the entire time the pipeline is being lowered to the floor of the body of water, the subject method is not necessarily so limited since the restraining force may also be employed during only a portion of the time the pipeline is being lowered. For example, the restraining force may be exerted until the loop in the composite pipeline reaches a position as predetermined by analysis at which the pipe will descend under its own weight without deforming or kinking the pipe. At this point the pipe loop may be released to descend the remaining distance to the ocean floor without tension. When the pipeline has settled on the ocean floor the guide 23 is removed and the pipeline assumes the position shown in FIGURE 7. Actually, there are several methods for maintaining proper tension. Both pipeline segments could be laid in the 90° curve, lowered to the sea floor on wire ropes, and simultaneously recovered on the individual wire ropes to positions on the lay barge with line segments in parallel and with proper tension applied to each line. Alternatively, with the reel barge the first segment could be positioned and buoyed off on a wire rope as above, the reel barge could overrun this position with the second segment sufficiently that the wire rope attached to the first segment could be recovered and proper tension applied, so that the reel barge could "back down," pulling the first segment on board with tension and reeling-up pipe of the second segment with tension, until the parallel lines could be connected. This would, of course, require a load transfer and cutoff of the pipeline segment connected to the reel.

It is considered most impotrant to emphasize that the application of analytically-determined controlled tensioning of the pipeline during laying, making the connection, and laying down the "excess loop" is a critical factor in the successful installation by the described method.

As the loop portion formed by the ends of the pipelines 18 and 21 is lowered onto the floor 13 of the body of water, some twisting or torsional strains may be created if the major portions of the pipelines laying along the water floor. However, tests have shown that ordinary pipe is capable of withstanding the strain created by laying down the loop portion without causing structural damage to the pipelines. It will be noted that the 90° rotation of the pipelines which results from lowering the loop portion of pipelines 18 and 21 is taken up by the major portions of the pipelines laying along the water floor 13 and typically, the pipelines are so long that the torsion per unit length of pipeline is a very small quantity. Thus, it is unnecessary to provide a swivel joint in the pipeline itself or at its connection to the fixed facilities although such a joint may be employed without departing from the scope of this invention.

In an alternative method illustrated in FIGURES 12–15, it can be seen that by extending the two pipe segments for a distance, say several hundred yards, parallel to each other, the ends may be connected with a connector 22 similar to that shown in FIGURE 5 but having an arc of 180°, which would reduce localized high bending stresses in the vicinity of the connector. Also, such a connection would facilitate the laying, connecting and subsequent lowering of the connector, as described above with reference to FIGURES 1–7.

By having the two ends parallel, or nearly so, it is possible to eliminate the use of a second guide on the vessel as shown in FIGURE 4. In fact, the connection itself may be made at the angle (with respect to horizontal) dictated by the tension applied while raising the pipeline ends.

To further describe the above concept, the connection might be accomplished with referene to FIGURES 12–15 as follows. Pipeline segment 18 (FIGURE 12) is terminated after having been deviated 90° more or less (with the assistance of anchors, or other type of restraint) and continued for a distance depending upon the length of pipe necessary to later raise the end to the surface. The end of pipe 18 is lowered by cable under tension and the cable is secured to a buoy in a manner similar to that described with regard to FIGURE 2.

Pipeline segment 21 (FIGURE 12) is constructed simultaneously or in sequence) so as to be terminated in a similar maner on bottom with the end parallel and in near proximity to the end of segment 18. At this time the pipe laying vessel is in position to recover pipelines 18 and 21 simultaneously by the application of tension, moving the vessel as the cables are taken up by the two tension winches 33.

Once raised, the pipe ends may be held by slips or other devices on support frame 34 (FIGURES 12 and 13) while the ends are prepared for connector 22. It is obvious that tension may be maintained by the vessel mooring system, or by applying tension to a movable platform which carries frame 34, or by individually applying tension to the slips or devices on the frame.

Figure 14:
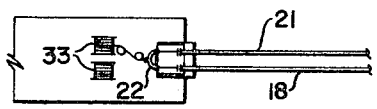
FIGURES 14 and 15 are details of the pipeline ends and connector.
Figure 15:
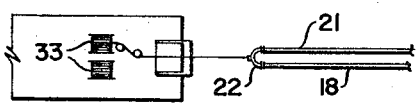

The connector 22 is now welded or otherwise connected to pipelines 18 and 21 (see FIGURE 14). A single cable from one of the tension controlling winches 33 is then connected to 22. The connector 22 and pipeline segments 18 and 21 are lowered to the sea floor by tension, the pipe laying vessel 10 moving as necessary to maintain the proper horizontal component of tension in the suspended portions of the pipeline segments.

Figure 8:
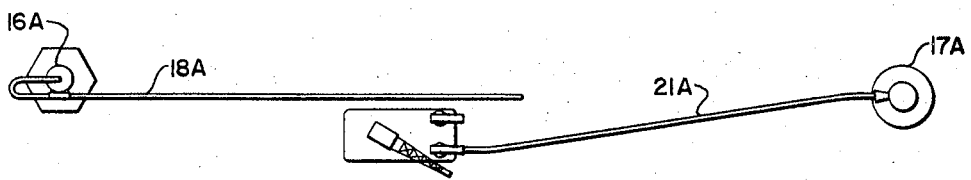
FIGURE 8 is a plan view of one modification of the method showing the first pipeline laid and the second pipeline being laid.
Figure 9:
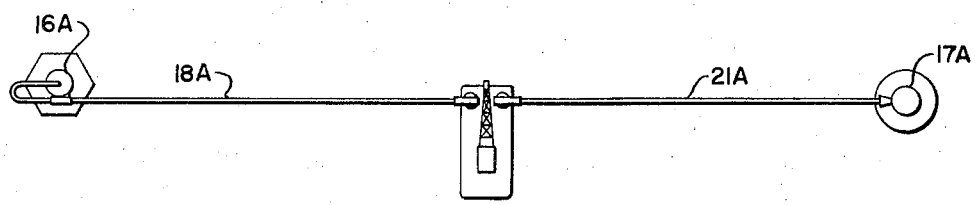
FIGURE 9 is a plan view of the modification showing the pipeline in position to be connected on the lay barge.

Although the preferred form of the inveition as set out above described forming a loop by curving the terminal portions of the pipelines in the horizontal plane, it will be observed that the method may also be practiced without the necessity of so curving the terminal portions. For example, in an alternative arrangement shown in FIGURES 8 and 9, pipelines 18a and 21a are laid in a substantially straight path along a line drawn between the facilities 16a and 17a. In this method, pipeline 18a is first laid in the manner described for laying pipeline 18 except that the line is laid without changing the heading of the lay barge. Pipeline 21a is then laid in a straight path up to and past the end of pipeline 18a. When the barge has passed the end of pipeline 18a, the end is recovered to the surface and drawn over a guide to be connected as shown in FIGURE 9. The procedure for connecting the pipelines is the same as described above. The connected portion formed by the pipeline ends is then lowered under tension onto the ocean in the same manner described in the preferred method, thus lowering the vertical loop to a horizontal position on the sea floor.

Figure 10:
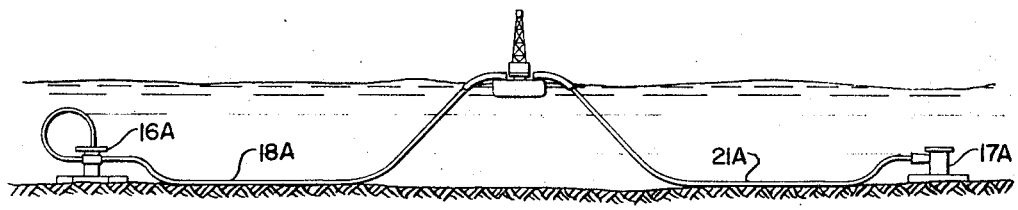
FIGURE 10 is an elevation of FIGURE 9.
Figure 11:
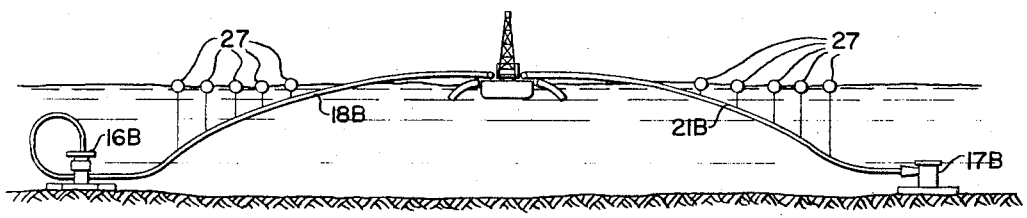
FIGURE 11 is an elevation of FIGURE 9 showing another modification of the method.
Figure 12:
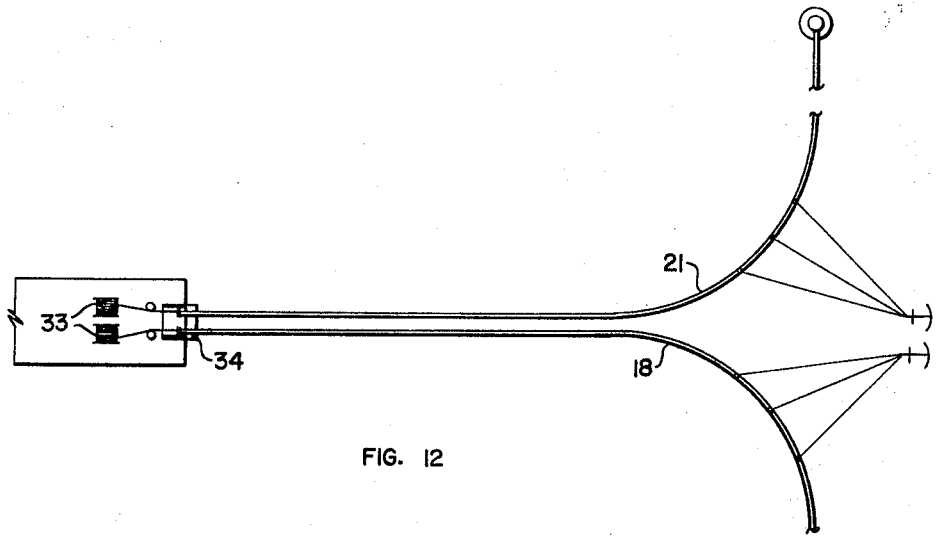
FIGURE 12 is a plan view of a modification of the invention wherein the pipelines are laid in a curve with the ends parallel.
Figure 13:
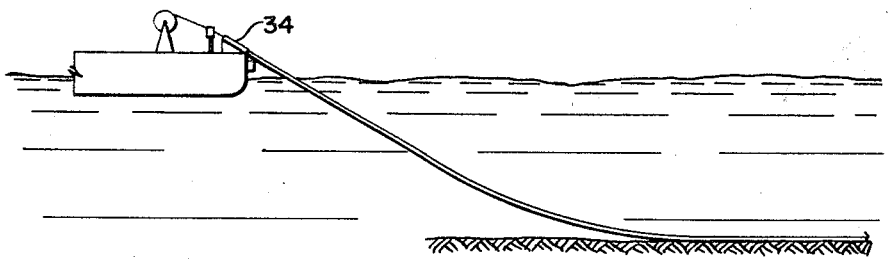
FIGURE 13 is an elevation of the modification shown in FIGURE 12.

In this alternative method the pipelines are connected by an arcuate connector as shown in FIGURE 5, since the terminal portions of the pipelines are curved in the vertical plane when they are connected as shown in FIGURE 10.

In still another form of the invention shown in FIGURE 10, pipelines 18b and 21b are pulled toward each other on the barge to reduce the catenary curve or sag in the pipelines and to draw the end portions into substantially horizontal end-to-end relationship. The pipelines may then be connected with a straight section of pipe for example by welding. The loop formed in the joined pipeline is lowered to the ocean floor under tension as described above. Since the pipelines 18b and 21b are pulled onto the barge to reduce the sag, the natural tendency of the assembled pipeline is to restore itself to the original catenary condition thus producing a downward force. To compensate for this force suitable releasing buoyancy means may be positioned along the curved portions of the pipelines in the form of buoys 27. The buoys may then be sequentially released as the pipeline is laid on the ocean floor. Other suitable means of opposing the downward force may be utilized without departing from the scope of the invention, e.g., davit supported guidelines strung from a barge.

Figure 16:
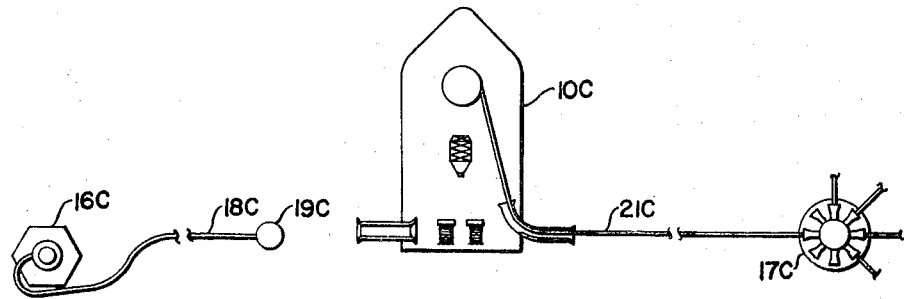
FIGURE 16 is a plan view of still another modification of the invention in which the pipelines are laid in a substantially straight line.
Figure 17:
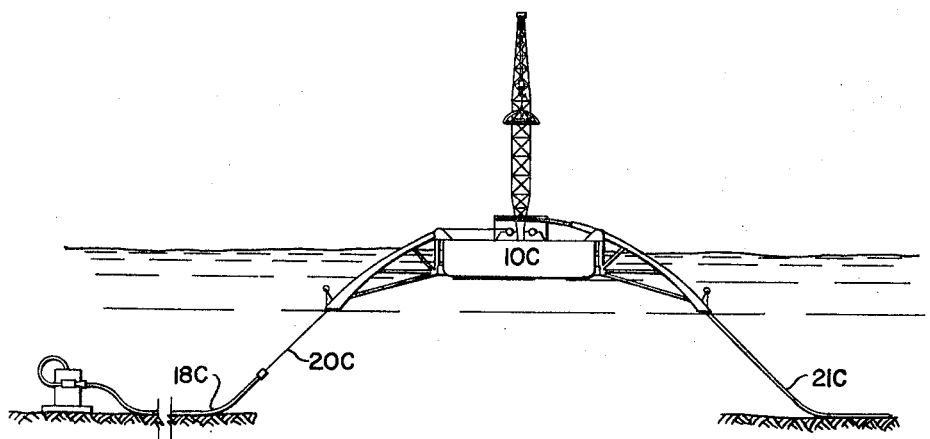
FIGURE 17 is an elevation of FIGURE 16.

In still another alternative form of the invention shown in FIGURES 16 and 17, line 18c is not curved in a direction perpendicular to the wellhead when being laid on the ocean floor but rather is brought to rest in a straight line directed towards facility 17. After line 18c is laid the end is buoyed off with a buoy 19c. The laying of line 21c proceeds from facility 17c directly towards buoy 19c as best shown in FIGURE 16. Thus far the laying of pipelines 18 and 21 is similar to that described above with reference to FIGURES 8 and 9.

However, as the buoy 19c is approached, recovery line 20c is picked up. Following this and while maintaining the proper tensile strain in line 21c, line 18c is again retensioned through recovery line 20c. At the time the recovery line 20c has been properly tensioned it follows that the laying of pipeline continues as pipeline 18c is brought to the surface and onto the lay barge 10c. Subsequent sequential operations to connect the pipelines and lay the loop onto the ocean floor are similar to those described and illustrated hereinabove with regard to the preferred form disclosed in FIGURES 1–4.

Figure 18:
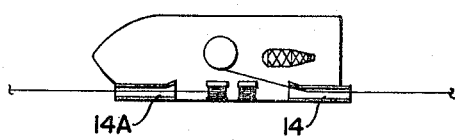
FIGURE 18 is a plan view of a modified barge for use with the method disclosed in FIGURES 16 and 17.

It is also possible when utilizing the techniques where the pipelines 18c and 21c are laid straight to employ a barge having guides 14 and 14a mounted alongside the barge as shown in FIGURE 18. When such a barge is used it would be unnecessary to change the barge heading in order to pull pipeline 18 over guide 14a, since guide 14a is disposed in the direction of pipeline 18.

It will be observed that the methods of laying thus far described result in a pipeline which is readily recovered to the surface by lifting the "loop" formed in the pipeline. This ability is particularly important since it permits recovery of the pipeline to the surface for repair and replacement when necessary. In addition, a branch connection can be installed in existing pipeline by recovering the "loop," making the branch connection and lowering the "loop" under tension in the manner in which it was originally laid. As shown in FIGURE 23, the connector 22 is preferably provided with a grapple projection or fluke 33 so that the connector may be more readily recovered with a grappling hook. Other recovery techniques may be employed, e.g., the connector may be buoyed off with a recovery line.

Having thus described our invention, what we claim is:

1. A method of laying a pipeline having a major portion lying on the floor of a body of water and connectible in fluid-transporting relationship between two fixed facilities at least one of which is located on said floor, comprising the steps of:
    (a) connecting a first end of a first pipeline segment to one of said facilities;
    (b) laying said first segment on said floor in a path substantially along a line drawn between said facilities and short of the other facility;
    (c) connecting a first end of a second pipeline segment to the other facility;
    (d) laying said second segment on said floor in a path substantially along a line drawn between said facilities, the combined length of said pipeline segments being equal to the distance between said facilities plus a distance sufficient to raise the terminal ends of said pipeline segments substantially to the surface at the point of connection while the major portion of said pipeline remains on the floor;
    (e) connecting the terminal ends of said segments in fluid-conducting relationship approximately at the surface of said body of water;
    (f) lowering said connected terminal ends onto the floor of said body of water; and,
    (g) applying predetermined tensioning force to said connected terminal ends from the surface of said body of water, said force having two components; a vertical component acting upwardly and a horizontal component which acts substantially perpendicular to and away from a line drawn between the facilities joined by said pipeline segments during at least a portion of the time said terminal ends are being lowered, said horizontal component being of such magnitude as to move said connected terminal ends in a horizontal direction.

2. The method as described in claim 1 wherein:
    (a) said first pipeline segment is laid in a path having a major portion adjacent said connected end extending substantially along a line drawn between said facilities and having a horizontally arcuate terminal portion remote from said connected end and approaching an arc of curvature of 90°; and,
    (b) said second pipeline segment is laid in a path having a major portion adjacent said connected end extending substantially along a line drawn between said facilities and having a horizontally arcuate terminal portion remote from said connected end approaching an arc of curvature of 90°, the terminal portion of said second pipeline segment terminating in the vicinity of the terminal portion of said first pipeline segment.

3. The method as defined in claim 1 including the steps of:
    (a) recovering the terminal end of said first pipeline segment as said second pipeline segment is being laid; and,
    (b) applying tension to said terminal end to raise said terminal end to the surface of said body of water simultaneously with the final laying of said second pipeline segment.

4. The method as defined in claim 1 wherein said second segment is laid on said floor in a path substantially along a line drawn between said facilities and said second segment extends past the terminal end of said first pipeline segment a distance substantially equal to the depth of the water body in which said pipelines are being laid.

5. The method as described in claim 1 wherein the step of laying said first pipeline segment and the step of laying said second pipeline segment are performed at substantially the same time.

6. The method as described in claim 1 wherein the steps of connecting said pipeline segments to said facilities and laying said segments are performed from a vessel operating on the surface of said body of water.

7. The method as described in claim 6 wherein the step of connecting the terminal portion ends of said pipeline segments is performed at said surface vessel.

8. The method as described in claim 5 wherein said step of applying said tensioning force includes the steps of:
    (a) attaching at least one line to said connected terminal portions from a surface vessel;
    (b) moving said vessel in a substantially perpendicular course away from said line drawn between said facilities;
    (c) laying out said line from said vessel as the vessel is moved; and,
    (d) applying a partial restraining force on said line during at least a portion of the time said line is laid out thereby applying tension to said connected terminal portions during the corresponding portion of the time said pipeline is being lowered onto the floor of said body of water.

References Cited

UNITED STATES PATENTS 2,981,074  4/1961  Wilder _____ 61—72.3
3,233,314  2/1966  Watkins et al. _____ 29—237

JACOB SHAPIRO, *Primary Examiner.*

U.S. Cl. X.R.
29—237; 61—46.5